(12) United States Patent
Kollmann et al.

(10) Patent No.: US 9,545,901 B2
(45) Date of Patent: Jan. 17, 2017

(54) METHOD FOR OPTIMIZING THE PRESSURE SETTING ACCURACY

(75) Inventors: Holger Kollmann, Rodgau (DE); Peter Leska, Dreieich (DE); Ralph Gronau, Wetter (DE); Michel Wagner, Zwingenberg (DE); Jörg Berntheusel, Neu Anspach (DE); Erik Händler, Lampertheim (DE); Silvio Färber, Hofheim (DE); Patrik Henke, Frankfurt (DE); Alexander Treib, Heddernheim (DE); Andreas Neu, Kuhardt (DE)

(73) Assignee: Continental Teves AG & Co. oHG (DE)

( * ) Notice: Subject to any disclaimer, the term of this patent is extended or adjusted under 35 U.S.C. 154(b) by 200 days.

(21) Appl. No.: 14/236,441

(22) PCT Filed: Jul. 31, 2012

(86) PCT No.: PCT/EP2012/064965
§ 371 (c)(1),
(2), (4) Date: Jul. 21, 2014

(87) PCT Pub. No.: WO2013/017598
PCT Pub. Date: Feb. 7, 2013

(65) Prior Publication Data
US 2014/0345988 A1    Nov. 27, 2014

(30) Foreign Application Priority Data
Aug. 1, 2011 (DE) .................. 10 2011 080 227

(51) Int. Cl.
B60T 8/172    (2006.01)
B60T 17/22    (2006.01)
(Continued)

(52) U.S. Cl.
CPC ............. *B60T 8/172* (2013.01); *B60T 7/042* (2013.01); *B60T 8/17551* (2013.01); *B60T 8/32* (2013.01);
(Continued)

(58) Field of Classification Search
CPC ........ B60T 7/042; B60T 8/356; B60T 8/4054; B60T 8/17551; B60T 8/36; B60T 8/3655; B60T 8/4872; B60T 8/172; B60T 8/32; B60T 13/662; B60T 13/686; B60T 17/04; B60T 17/22; B60T 17/221; F15B 21/087; F15B 11/028; G05D 7/0635; Y10T 137/0396
(Continued)

(56) References Cited

U.S. PATENT DOCUMENTS 6,238,020 B1 * 5/2001 Gronau ............... B60T 8/17616
   303/158
6,504,699 B1 * 1/2003 Rader ....................... B60T 8/36
   137/599.16
(Continued)

FOREIGN PATENT DOCUMENTS

DE    10106464 A1    1/2002
DE    102 24 059 A1  8/2003
(Continued)

OTHER PUBLICATIONS

International Search Report for PCT/EP2012/064965 mailed May 7, 2013.
German Search Report for PCT/EP2012/064965 mailed May 21, 2012.

*Primary Examiner* — Thomas J Williams
*Assistant Examiner* — San Aung
(74) *Attorney, Agent, or Firm* — RatnerPrestia

(57) ABSTRACT

In a method for optimizing the pressure setting accuracy, a hydraulic pressure is built up according to a pressure
(Continued)

requirement of a hydraulic pump, and overflow control is performed using an analog-controlling hydraulic valve and a known control characteristic curve of the analog-controlling hydraulic valve, which overflow control counteracts a pressure build-up produced by the hydraulic pump that exceeds the pressure requirement. In addition to the known control characteristic curve of the analog-controlling hydraulic valve, at least one additional valve characteristic is taken into account for the overflow control.

16 Claims, 1 Drawing Sheet

(51) Int. Cl.
| | |
|---|---|
| B60T 13/68 | (2006.01) |
| B60T 8/1755 | (2006.01) |
| B60T 8/32 | (2006.01) |
| B60T 7/04 | (2006.01) |
| B60T 8/36 | (2006.01) |
| B60T 8/40 | (2006.01) |
| B60T 8/48 | (2006.01) |
| B60T 13/66 | (2006.01) |
| B60T 17/04 | (2006.01) |
| G05D 7/06 | (2006.01) |
| F15B 11/028 | (2006.01) |
| F15B 21/08 | (2006.01) |

(52) U.S. Cl.
CPC ............... B60T 8/36 (2013.01); B60T 8/365 (2013.01); B60T 8/3655 (2013.01); B60T 8/4054 (2013.01); B60T 8/4872 (2013.01); B60T 13/662 (2013.01); B60T 13/686 (2013.01); B60T 17/04 (2013.01); B60T 17/22 (2013.01); B60T 17/221 (2013.01); F15B 11/028 (2013.01); F15B 21/087 (2013.01); G05D 7/0635 (2013.01); Y10T 137/0396 (2015.04)

(58) Field of Classification Search
USPC .................................. 188/151 R; 251/129.04
See application file for complete search history.

(56) References Cited

U.S. PATENT DOCUMENTS

| | | | |
|---|---|---|---|
| 8,577,506 B2 | 11/2013 | Neu et al. | |
| 8,620,556 B2 | 12/2013 | Müller et al. | |
| 2003/0214183 A1* | 11/2003 | Breitenbacher | B60T 8/36 303/162 |
| 2003/0218380 A1 | 11/2003 | Breitenbacher et al. | |
| 2004/0026990 A1* | 2/2004 | Haeussler | B60T 8/36 303/113.1 |
| 2009/0037065 A1* | 2/2009 | Burkhard | B60T 8/36 701/71 |
| 2010/0121548 A1* | 5/2010 | Muller | B60T 8/36 701/77 |
| 2011/0077832 A1* | 3/2011 | Niino | B60T 7/042 701/70 |

FOREIGN PATENT DOCUMENTS

| | | |
|---|---|---|
| DE | 102 27 785 A1 | 9/2003 |
| DE | 10 2005 014 097 A1 | 4/2006 |
| DE | 10 2005 051 436 A1 | 5/2007 |
| DE | 10 2007 019 732 A1 | 12/2007 |
| DE | 10 2007 023 320 A1 | 12/2007 |
| DE | 10 2008 013 043 A1 | 9/2008 |
| DE | 10 2007 019 929 A1 | 11/2008 |
| DE | 10 2008 006 653 A1 | 8/2009 |
| DE | 10 2008 042 737 A1 | 4/2010 |
| DE | 10 2008 042 771 A1 | 4/2010 |
| DE | 10 2008 060 622 A1 | 4/2010 |
| DE | 102009047335 A1 | 6/2011 |
| EP | 1876078 A2 | 1/2008 |
| WO | WO 2005/054028 A1 | 6/2005 |
| WO | WO 2006/042859 A1 | 4/2006 |

* cited by examiner

METHOD FOR OPTIMIZING THE PRESSURE SETTING ACCURACY

CROSS REFERENCE TO RELATED APPLICATIONS

This application is the U.S. National Phase Application of PCT/EP2012/064965, filed Jul. 31, 2012, which claims priority to German Patent Application No. 10 2011 080 227.4, filed Aug. 1, 2011, the contents of such applications being incorporated by reference herein.

FIELD OF THE INVENTION

The invention relates to a method for optimizing the pressure setting accuracy wherein a hydraulic pressure is built up by means of a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand, to the use of said method, and to a hydraulic or electrohydraulic vehicle brake system.

BACKGROUND OF THE INVENTION

Extremely precise control and regulation of analogized digital valves in modern vehicle brake systems with hydraulic pressure regulation constitutes an increasingly important prerequisite for a multiplicity of different regulation functions and comfort functions, such as for example systems for inter-vehicle distance regulation and speed regulation, such as are becoming ever more widely used. Through the use of pressure sensors in each individual wheel brake cylinder, it is possible at all times to perform a precise pressure measurement and, associated therewith, precise adjustment to the required brake pressure. This however leads to high cost outlay for the additional pressure sensors and, in association therewith, higher overall costs for the brake system, which in turn has an adverse effect on the commercial competitiveness of such systems.

One possibility, known in the prior art, for avoiding the use of additional pressure sensors and associated additional costs can be achieved by gauging the opening and closing current in the form of a characteristic curve which correlates a pressure difference prevailing across the valve with an exciter current. This permits substantially precise regulation of an analogized hydraulic valve even without additional pressure sensors. Such a method is disclosed for example in DE 102 24 059 A1, which is incorporated by reference. In said method, the characteristic curve is stored electronically in the regulation system and, by means of the exciter current, it is subsequently possible to set a pressure difference in a targeted manner without having to resort to physically measured pressure data.

DE 10 2005 051 436 A1, which is incorporated by reference, likewise proposes a method for pressure regulation in a hydraulic brake system without the use of additional pressure sensors. Here, the analog-regulation hydraulic valves are calibrated by means of the ABS wheel rotational speed sensors provided on the vehicle, which determine a rotational speed decrease and thus a braking action as a function of the exciter current. This method permits valve calibration without the use of additional measurement sensors directly on the vehicle itself. The actuation characteristic curve determined in this way is electronically stored and used for the pressure regulation.

DE 10 2008 060 622 A1, which is incorporated by reference, discloses a hydraulic motor vehicle brake system which comprises a continuous-delivery pressure medium pump. Adjustment to a certain pressure demand can be performed by means of overflow regulation of the cut-off valve or of the outlet valve. Here, since the pressure adjustment is substantially dependent on the overflow behavior of the regulating valves and the actuation characteristic curve alone does not provide information regarding the flow passing through a valve, additional pressure sensors are used in the region of the wheel brakes.

The disadvantage of the methods known from the prior art for calibration and subsequent pressure regulation without additional pressure sensors consists in that the pressure regulation is performed taking into consideration only a single valve characteristic, specifically the actuation characteristic curve. By contrast, the actual throughflow or overflow behavior and the associated rate of change of pressure are not taken into consideration. In the prior art, if the overflow behavior is of particular significance, the information required for regulation is obtained by means of additional pressure sensors. Furthermore, each valve—like the pumps and pump motors used for the build-up of pressure—are subject to certain manufacturing tolerances owing to the production process; it is also the case that a calibration of said devices is possible only with limited accuracy. In the worst case, the various tolerances of the devices involved in the pressure regulation may add up in the same direction, with the result that, in the event of a pressure selection, severe and enduring pressure setting inaccuracies may arise in the system. This leads to regulation oscillations which are acoustically and haptically perceptible to the driver and which are often regarded as vehicle malfunctions.

SUMMARY OF THE INVENTION

An aspect of the present invention proposes a method which, taking into consideration at least one further valve characteristic in addition to the actuation characteristic curve and without the use of additional pressure sensors, permits substantially precise pressure adjustment, and at the same time eliminates pressure setting inaccuracies about the pressure selection point.

This is achieved according to an aspect of the invention by means of the method for optimizing the pressure setting accuracy wherein a hydraulic pressure is built up by means of a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand, wherein in addition to the known actuation characteristic curve of the analog-regulation hydraulic valve, at least one further valve characteristic is taken into consideration for the overflow regulation, and by means of the hydraulic or electrohydraulic vehicle brake system comprising at least one master cylinder for the supply of hydraulic fluid, at least one inlet valve for the admission of a pressure into at least one wheel brake cylinder assigned to a vehicle brake and at least one outlet valve for the release of the pressure from the at least one wheel brake cylinder assigned to a vehicle brake, also comprising at least one hydraulic pump, at least one electronic control and regulation unit and at least one analog-regulation cut-off valve, wherein the hydraulic pump builds up a hydraulic pressure in accordance with a pressure demand from the electronic control and regulation unit, and the electronic control and regulation unit, using the cut-off valve and a stored actuation characteristic curve of the cut-off valve, performs overflow regulation which counteracts a pressure build-up, generated by the hydraulic pump, which goes beyond the pressure demand, wherein, for the overflow regulation, the electronic control and regulation unit takes into consideration not only the stored actuation characteristic curve of the cut-off valve but also one further valve characteristic of the cut-off valve.

In the pressure setting method according to aspects of the invention, to avoid pressure pulsations, a hydraulic pressure is built up by means of a hydraulic pump in accordance with a pressure demand and, using an analog-regulation hydraulic valve and a known actuation characteristic curve of the analog-regulation hydraulic valve, overflow regulation is performed. Here, the overflow regulation counteracts the pressure pulsations generated by the hydraulic pump. The pressure setting method according to aspects of the invention is characterized in that, in addition to the known actuation characteristic curve of the analog-regulation hydraulic valve, at least one further valve characteristic is taken into consideration for the overflow regulation. Since the actuation characteristic curve specifies only the opening point or closing point, assigned to a prevailing pressure difference, of the analog-regulation hydraulic valve, taking into consideration the actuation characteristic curve alone does not permit precise control of the hydraulic fluid volume flow because any valve has individual throughflow characteristics owing to manufacturing tolerances. The throughflow characteristics however have a significant influence on the rate of pressure build-up and rate of pressure dissipation of the hydraulic system, the knowledge of which is of great significance for precise pressure regulation. Additionally taking into consideration valve characteristics aside from the actuation characteristic curve thus permits improved and more precise pressure regulation.

It is preferably provided that the at least one further valve characteristic is an overflow characteristic map. Because the pressure setting method according to aspects of the invention performs overflow regulation for the pressure adjustment, the knowledge of the overflow behavior and thus of the throughflow characteristics of the hydraulic valve is an important regulating variable. Since the pressure-dependent overflow behavior can be read out from the overflow characteristic map, this yields the advantage that the rates of pressure build-up and pressure dissipation can be determined, and the regulation can accordingly be performed with greater precision.

It is particularly preferably provided that the overflow characteristic map represents an overflow behavior of a hydraulic valve of averaged characteristics. This yields the advantage that it is not necessary to perform cumbersome individual measurement of each individual hydraulic valve. Rather, from a certain number of hydraulic valves measured as examples, an averaged characteristic is determined for all hydraulic valves of a production batch. Thus, the additional measurement outlay and the associated additional costs remain relatively low.

In one advantageous embodiment of the invention, it is provided that the overflow characteristic map is modified on a valve-specific basis by means of the known actuation characteristic curve. Since statements regarding the characteristic valve behavior can be made on the basis of the actuation characteristic curve alone, it is possible on the basis of the actuation characteristic curve to modify the averaged flow transfer characteristic map as a function of the actuation characteristic curve.

In a further preferred embodiment, it is provided that the known actuation characteristic curve is a valve-specific actuation characteristic curve. The use of a valve-specific actuation characteristic curve for the valve regulation firstly yields the advantage that the opening point and the closing point specific to each hydraulic valve are both precisely known. This improves the accuracy of the pressure regulation. Secondly, the overflow characteristic map can be modified individually by means of the individual actuation characteristic curve, such that it is also the case that a substantially individual overflow characteristic map is provided without the latter having to be gauged on a valve-specific basis. Thus, an individually modified overflow characteristic map is assigned to each individual hydraulic valve, which permits further improved pressure regulation.

It is expediently provided that the known actuation characteristic curve is determined after the connection of the hydraulic valve into a hydraulic or electrohydraulic vehicle brake system. This is possible in a particularly simple and precise manner by gauging the vehicle brake system in a test stand at the end of the manufacturing process. Cumbersome calibration methods which would have to be carried out at a later time during the operation of the vehicle brake system, and which would lead to an interruption or disruption of operation, are thus eliminated.

Furthermore, it is advantageous if the known actuation characteristic curve is determined and/or corrected repeatedly during operation. Since the valve characteristics may vary over the course of the service life of the valve, repeatedly newly determining or correcting the actuation characteristic curve has the advantage that the opening and closing points of the hydraulic valves are always substantially precisely known. In order that the operation of the vehicle brake system is not unduly disrupted by the new determination and/or correction, the new determination and/or correction may be performed for example while the vehicle is at a standstill when the ignition is deactivated.

In a further preferred embodiment of the invention, it is provided that the known actuation characteristic curve represents an opening current versus a pressure difference prevailing across the hydraulic valve. The relationship between the current required for opening the hydraulic valve and the pressure difference prevailing across the hydraulic valve is thus known, whereby substantially precise actuation of the hydraulic valve is made possible in the case of any pressure difference.

It is furthermore advantageous for the analog-regulation hydraulic valve to be a valve which is open in the normal position. By virtue of the analog-regulation hydraulic valve being configured as a valve which is open in the normal position, the responsiveness of the vehicle brake system is maintained in the event of a failure of the electrical control and regulation functions, because the driver can continue to generate a build-up of pressure in the brake cylinder by actuation of the brake pedal.

It is furthermore preferable for the analog-regulation hydraulic valve which is used to perform the overflow regulation to be a cut-off valve of a hydraulic or electrohydraulic brake system. The cut-off valve is particularly well-suited to the overflow regulation because hydraulic fluid that is caused to flow out during the course of the overflow regulation is thus returned directly to the master cylinder. Unnecessary filling of the low-pressure accumulator is thus avoided.

In a further preferred embodiment of the invention, it is provided that the overflow characteristic map represents a regulation current versus a hydraulic fluid volume flow rate as a function of a pressure difference prevailing across the hydraulic valve. This yields the advantage that, from the hydraulic fluid volume flow rate, the actual pressure-dependent flow transfer behavior is known, not just the opening and closing points of the hydraulic valve. Since the hydraulic fluid volume flow rate is a significant factor for the rates of pressure build-up and pressure dissipation, substantially precise overflow regulation is possible only with the knowledge thereof.

The method according to aspects of the invention is preferably characterized in that a quantitative modification of the overflow characteristic map increases with the value of the deviation of the opening current determined on a valve-specific basis in the case of a pressure difference of substantially 0 bar from the opening current of a hydraulic valve of averaged characteristics, or increases with the value of the deviation of the closing current determined on a valve-specific basis in the case of a pressure difference of substantially 0 bar from the closing current of a hydraulic valve of averaged characteristics. This yields the advantage that the overflow characteristic map does not need to be gauged in a cumbersome, valve-specific manner, because use is made of a simple quantitative relationship with the actuation characteristic curve, which is known on a valve-specific basis.

The method according to aspects of the invention is particularly preferably characterized in that, if a closing current determined on a valve-specific basis in the case of a pressure difference of substantially 0 bar prevailing across the hydraulic valve is less than a closing current determined in the case of a pressure difference of substantially 0 bar prevailing across a hydraulic valve of averaged characteristics, a modification is performed for a reduction of the regulating current versus the hydraulic fluid volume flow rate in the overflow characteristic map. This yields the advantage that the situation, known from the actuation characteristic curve, of a hydraulic valve allowing too little hydraulic fluid to flow out during the course of flow transfer regulation can be utilized in a simple manner to increase the hydraulic fluid volume flow rate for a given regulating current. Thus, the regulation-current-dependent hydraulic fluid volume flow of the hydraulic valve is adapted to the individual characteristic of said hydraulic valve. If said hydraulic valve is a hydraulic valve which is closed in a deenergized state, the modification of the regulating current is performed in accordance with the individual opening current of the hydraulic valve.

It is also particularly preferably provided that, if a closing current determined on a valve-specific basis in the case of a pressure difference of substantially 0 bar prevailing across the hydraulic valve is greater than a closing current determined in the case of a pressure difference of substantially 0 bar prevailing across a hydraulic valve of averaged characteristics, a modification is performed for an increase of the regulation current versus the hydraulic fluid volume flow rate in the overflow characteristic map. In this case, this yields the advantage that a hydraulic valve that allows too much hydraulic fluid to flow out during the course of overflow regulation is subject to a modification, which compensates for this situation, of its overflow characteristic map. It is thus the case here, too, that the regulation-current-dependent hydraulic fluid volume flow rate of the hydraulic valve is adapted to the individual characteristic of said hydraulic valve. In the case of a hydraulic valve which is closed in a deenergized state, an analogous modification of the regulation current is performed in accordance with the individual opening current of the hydraulic valve.

It is furthermore advantageous for the known actuation characteristic curve to be determined by means of a pneumatic calibration method. This permits a simple and fast determination of the actuation characteristic curve without the need for the system that is to be calibrated having to be filled with hydraulic fluid.

It is furthermore preferable for the known actuation characteristic curve to be determined by means of a valve plunger position detection method. A valve plunger position detection method, such as is known per se, offers the advantage here that the hydraulic valve can be hydraulically or pneumatically gauged in a simple manner any time, even after installation into the vehicle brake system.

It is furthermore expedient for the analog-regulation hydraulic valve to be controlled and/or regulated by means of a pulse-width-modulated current. By means of pulse width modulation, it is possible in a simple manner to set a mean current value by means of the ratio of "on" phases to "off" phases. Analog actuation and adjustment to intermediate positions of the valve are thus made possible, which leads altogether to sensitive pressure regulation.

In a further preferred embodiment of the invention, it is provided that the method is carried out in a brake strand of a hydraulic or electrohydraulic vehicle brake system. Owing to the fact that driver assistance systems are becoming ever more complex and owing to the increasingly sensitive control and regulation demands in vehicle brake systems, extremely precise pressure setting accuracy, such as is permitted by the method according to aspects of the invention, is of great benefit here.

It is additionally provided that the vehicle brake system also comprises at least one inlet valve, at least one outlet valve, at least one low-pressure accumulator, at least one wheel brake cylinder assigned to a vehicle brake, at least one master cylinder, and at least one pressure sensor. Said devices are typically established components of a hydraulic or electrohydraulic vehicle brake system. The method according to aspects of the invention can thus advantageously be used in all established vehicle brake systems.

The present invention also relates to a hydraulic or electrohydraulic vehicle brake system which performs, in particular, the method according to aspects of the invention. The hydraulic or electrohydraulic brake system comprises at least one master cylinder for the supply of hydraulic fluid, at least one inlet valve for the admission of a pressure into at least one wheel brake cylinder assigned to a vehicle brake and at least one outlet valve for the release of the pressure from the at least one wheel brake cylinder assigned to a vehicle brake. The vehicle brake system according to aspects of the invention also comprises at least one hydraulic pump, at least one electronic control and regulation unit and at least one analog-regulation cut-off valve, wherein the hydraulic pump builds up a hydraulic pressure in accordance with a pressure demand from the electronic control and regulation unit, and the electronic control and regulation unit, using the cut-off valve and a stored actuation characteristic curve of the cut-off valve, performs overflow regulation which counteracts a pressure build-up, generated by the hydraulic pump, which goes beyond the pressure demand. The hydraulic or electrohydraulic vehicle brake system is characterized in that, for the overflow regulation, the electronic control and regulation unit takes into consideration not only the known actuation characteristic curve of the analog-regulation hydraulic valve but also a further valve characteristic.

The above-described advantages in respect of improved pressure regulation are achieved as a result.

It is expediently provided that, for the overflow regulation, the electronic control and regulation unit takes into consideration a stored overflow characteristic map as a further valve characteristic of the analog-regulation hydraulic valve. The throughflow characteristics and thus the rates of pressure build-up and pressure dissipation are thus known, which permits more precise pressure regulation.

It is also expedient for the electronic control and regulation unit to modify the stored overflow characteristic map on a valve-specific basis as a function of the stored actuation characteristic curve. This permits individually adapted and thus substantially optimal overflow regulation of the hydraulic valve.

It is preferably provided that the electronic control and regulation unit performs the overflow regulation using the cut-off valve. As already described, the cut-off valve is particularly well-suited to the overflow regulation because hydraulic fluid discharged during the course of the overflow regulation can be returned directly to the master cylinder, which avoids unnecessary filling of the low-pressure accumulator.

It is also preferable for the electronic control and regulation unit to determine and/or correct the stored actuation characteristic curve of the cut-off valve repeatedly during operation. Changes in the valve characteristics that arise over the course of the service life can thus be compensated. The use of pressure sensor information also offers the advantage that substantially precise measurement data characterizing the valve behavior are available for the new determination and/or correction of the actuation characteristic curve.

In a further preferred embodiment, it is provided that the electronic cut-off valve is a valve which is open in a normal position. In this way, in the event of failure of the electrical control and regulation functions, it is made possible for the driver to build up a brake pressure in the brake cylinders in the usual way by actuation of the brake pedal.

The invention also relates to the use of the pressure setting method according to aspects of the invention for preventing pressure pulsations in a system for inter-vehicle distance regulation and speed regulation of a motor vehicle.

BRIEF DESCRIPTION OF THE DRAWINGS

Further preferred embodiments will emerge from the subclaims and from the following description of an exemplary embodiment on the basis of figures, in which:

DETAILED DESCRIPTION OF THE INVENTION

Figure 1:
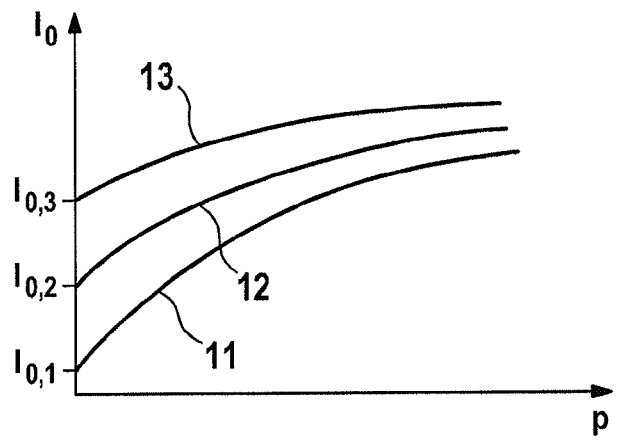
FIG. 1 shows actuation characteristic curves of three hydraulic valves with different behavior.

FIG. 1 illustrates, by way of example, the closing current $I_0$ versus a pressure difference p prevailing across a hydraulic valve for three different individual hydraulic valves (not illustrated). Characteristic curves 11, 12 and 13 are the valve-specific actuation characteristic curves of the three hydraulic valves and have been determined by means of a valve plunger position detection method directly after the connection of the hydraulic valves into a hydraulic or electrohydraulic vehicle brake system. Characteristic curve 11 has the lowest closing current $I_{0,1}$ at a prevailing pressure difference p=0, characteristic curve 12 has an average closing current $I_{0,2} > I_{0,1}$ at p=0, and characteristic curve 13 has a higher-than-average closing current $I_{0,3} > I_{0,2}$ at p=0. With increasing pressure difference p between valve inlet and valve outlet, the behaviors of the three hydraulic valves converge on one another to an increasing extent. From valve-specific actuation characteristic curves 11, 12 and 13, the pressure-dependent opening and closing points of the three hydraulic valves are known. Valve-specific actuation characteristic curves 11, 12 and 13 also allow statements to be made regarding the valve-specific overflow behavior of the associated hydraulic valves.

Figure 2:
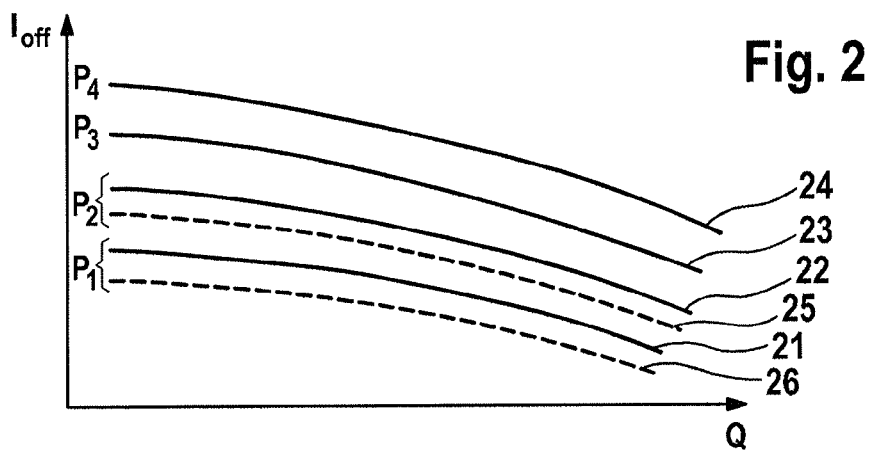
FIG. 2 shows an overflow characteristic map of a hydraulic valve of average characteristics, with a valve-specific modification at low pressures.

FIG. 2 shows, by way of example, an overflow characteristic map of a hydraulic valve of averaged characteristics (not illustrated), the overflow characteristic map being composed of graphs 21, 22, 23 and 24. The figure shows the pressure-dependent hydraulic fluid volume flow rate Q as a function of an offset current $I_{off}$ which is selected in a pressure-dependent manner and which has the regulation current $I_R$ added thereto in directional fashion in the case of different pressure differences $p_1 < p_2 < p_3 < p_4$. It can be seen from the overflow characteristic map that a higher offset current $I_{off}$ is required to achieve a certain hydraulic fluid volume flow rate Q in the case of large pressure differences than in the case of low pressures. Since graphs 21, 22, 23 and 24 illustrate the overflow behavior of a hydraulic valve of averaged characteristics, that is to say an average hydraulic valve, said graphs correspond to the behavior of the hydraulic valve characterized by actuation characteristic curve 12 in FIG. 1. In order to prevent an excessively high or excessively low hydraulic fluid volume flow rate Q from passing through the hydraulic valve in the case of deviating valve characteristics, the overflow characteristic map is modified in valve-specific fashion as a function of the actuation characteristic curves shown by way of example in FIG. 1. Graphs 25 and 26, illustrated by dashed lines, show an individual modification of said type for a hydraulic valve with relatively low closing current $I_0$, as illustrated for example by actuation characteristic curve 11 in FIG. 1. Since a hydraulic valve would, with an actuation characteristic curve 11 (FIG. 1) and a closing current $I_{0,1}$ (FIG. 1), allow too little hydraulic fluid to flow out during the course of unmodified overflow regulation, the overflow characteristic map is consequently modified for a hydraulic valve of said type such that graphs 21 and 22 are shifted toward lower offset currents I. This modification leads, according to the example, to overflow regulation of the hydraulic valve as per the graphs 25 and 26, illustrated by dashed lines, at pressures $p_1$ and $p_2$. Owing to the fact that even different hydraulic valves exhibit increasingly similar behavior at high pressures, a modification is not necessary at high pressures ($p_3$, $p_4$) in this exemplary embodiment. Graphs 23 and 24 thus do not need to be modified for precise regulation.

Figure 3:
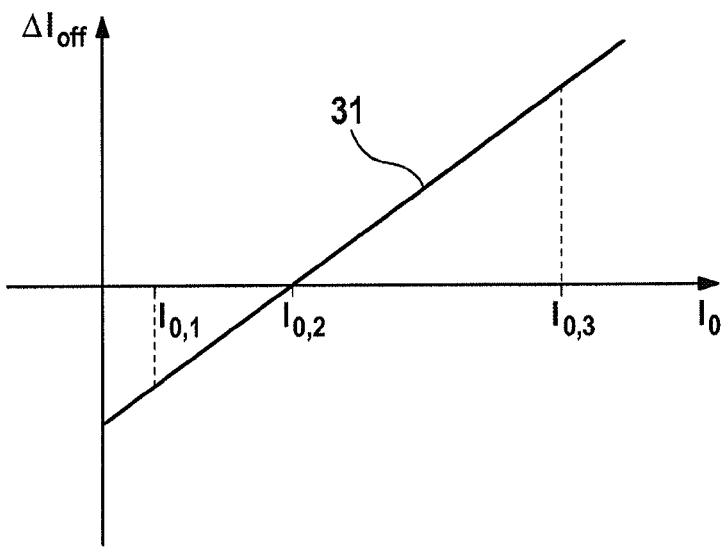
FIG. 3 shows a relationship between the valve-specific modification of an overflow characteristic map of a hydraulic valve of averaged characteristics and the valve-specific actuation characteristic curve of a hydraulic valve.

FIG. 3 shows, by way of example, the relationship between the modification of the overflow characteristic map and the determined opening current $I_0$ of a hydraulic valve in the case of a pressure difference p=0 in the form of a linear relationship 31. $\Delta I_{off}$ indicates the quantitative modification of the offset current $I_{off}$ as a function of the closing current Io in the case of a pressure difference p=0. In this exemplary embodiment, the closing current $I_{0,2}$ corresponds to an average hydraulic valve, of averaged characteristics. The closing current $I_{0,3}$ corresponds to the closing current of a hydraulic valve whose closing current $I_0$ is higher than average. The higher the closing current $I_0$ of a hydraulic valve is, the greater is the extent to which the overflow characteristic map by which the hydraulic valve is regulated is modified toward higher offset currents I. By contrast, the closing current $I_{0,1}$ represents a below-average closing current $I_0$, which leads to a reduction of the corresponding pressure-dependent offset current $I_{off}$ of the hydraulic valve in the overflow characteristic map that is used. Thus, in this exemplary embodiment, use is made of a linear relationship between the valve-specific quantitative modification of the overflow characteristic map and the valve-specific closing current $I_0$ in the case of a pressure difference of p=0.

The invention claimed is:

1. A method for optimizing a pressure setting accuracy, wherein a hydraulic pressure is built up by a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand wherein in addition to the known actuation characteristic curve of the analog-regulation hydraulic valve, at least an overflow characteristic map is taken into consideration for the overflow regulation.

2. The method as claimed in claim 1, wherein the overflow characteristic map represents an overflow behavior of a hydraulic valve of averaged characteristics.

3. The method as claimed in claim 1, wherein the overflow characteristic map is modified on a valve-specific basis by the known actuation characteristic curve.

4. A method for optimizing a pressure setting accuracy, wherein a hydraulic pressure is built up by a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand wherein in addition to the known actuation characteristic curve of the analog-regulation hydraulic valve, at least one further valve characteristic is taken into consideration for the overflow regulation, wherein the known actuation characteristic curve is a valve-specific actuation characteristic curve.

5. The method as claimed in claim 1, wherein the known actuation characteristic curve is determined after the connection of the hydraulic valve into a hydraulic or electrohydraulic vehicle brake system.

6. The method as claimed in claim 1, wherein the analog-regulation hydraulic valve which is used to perform the overflow regulation is a cut-off valve of a hydraulic or electrohydraulic brake system.

7. A method for optimizing a pressure setting accuracy, wherein a hydraulic pressure is built up by a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand wherein in addition to the known actuation characteristic curve of the analog-regulation hydraulic valve, at least one further valve characteristic is taken into consideration for the overflow regulation, wherein an overflow characteristic map represents a regulation current versus a hydraulic fluid volume flow rate as a function of a pressure difference prevailing across the hydraulic valve.

8. The method as claimed in claim 7, wherein a quantitative modification of the overflow characteristic map increases with the value of the deviation of an opening current determined on a valve-specific basis in the case of a pressure difference of substantially 0 bar from the opening current of a hydraulic valve of averaged characteristics, or increases with the value of the deviation of the closing current determined on a valve-specific basis in the case of a pressure difference of substantially 0 bar from the closing current of a hydraulic valve of averaged characteristics.

9. The method as claimed in claim 8, wherein, if a closing current determined on a valve-specific basis in the case of a pressure difference of substantially 0 bar prevailing across the hydraulic valve is less than a closing current determined in the case of a pressure difference of substantially 0 bar prevailing across a hydraulic valve of averaged characteristics, a modification is performed for a reduction of the regulating current versus the hydraulic fluid volume flow rate in the overflow characteristic map.

10. The method as claimed in claim 8, wherein, if a closing current determined on a valve-specific basis in the case of a pressure difference of substantially 0 bar prevailing across the hydraulic valve is greater than a closing current determined in the case of a pressure difference of substantially 0 bar prevailing across a hydraulic valve of averaged characteristics, a modification is performed for an increase of the regulation current versus the hydraulic fluid volume flow rate in the overflow characteristic map.

11. A method for optimizing a pressure setting accuracy, wherein a hydraulic pressure is built up by a hydraulic pump in accordance with a pressure demand and wherein, using an analog-regulation hydraulic valve and a known actuation characteristic curve of the analog-regulation hydraulic valve, overflow regulation is performed which counteracts a pressure build-up, generated by the hydraulic pump, which goes beyond the pressure demand wherein in addition to the known actuation characteristic curve of the analog-regulation hydraulic valve, at least one further valve characteristic is taken into consideration for the overflow regulation, wherein the known actuation characteristic curve is determined by a valve plunger position detection method.

12. A hydraulic or electrohydraulic vehicle brake system comprising:
at least one master cylinder for the supply of hydraulic fluid, at least one inlet valve for the admission of a pressure into at least one wheel brake cylinder assigned to a vehicle brake and at least one outlet valve for the release of the pressure from the at least one wheel brake cylinder assigned to a vehicle brake,
at least one hydraulic pump, at least one electronic control and regulation unit and at least one analog-regulation cut-off valve,
wherein the hydraulic pump builds up a hydraulic pressure in accordance with a pressure demand from the electronic control and regulation unit,
and the electronic control and regulation unit, using the cut-off valve and a stored actuation characteristic curve of the cut-off valve, performs overflow regulation which counteracts a pressure build-up, generated by the hydraulic pump, which goes beyond the pressure demand,
wherein, for the overflow regulation, the electronic control and regulation unit takes into consideration not only the stored actuation characteristic curve of the cut-off valve but also an overflow characteristic map of the cut-off valve.

13. The vehicle brake system as claimed in claim 12, wherein, for the overflow regulation, the electronic control and regulation unit takes into consideration a stored overflow characteristic map as a further valve characteristic of the cut-off valve.

14. The vehicle brake system as claimed in claim 12, wherein the electronic control and regulation unit modifies the stored overflow characteristic map on a valve-specific basis as a function of the stored actuation characteristic curve.

15. The vehicle brake system as claimed in claim 12, wherein the electronic control and regulation unit determines and/or corrects the stored actuation characteristic curve of the cut-off valve repeatedly during operation.

16. Use of the method as claimed in claim 1 for pressure regulation in a system for inter-vehicle distance regulation and speed regulation of a motor vehicle.

* * * * *